United States Patent
Shan

(10) Patent No.: US 9,639,117 B2
(45) Date of Patent: May 2, 2017

(54) ELECTRONIC DEVICE HAVING EXPANSION INTERFACE

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Hai-Tao Shan, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 192 days.

(21) Appl. No.: 14/556,826

(22) Filed: Dec. 1, 2014

(65) Prior Publication Data

US 2016/0131351 A1 May 12, 2016

(30) Foreign Application Priority Data

Nov. 11, 2014 (CN) .......................... 2014 1 0630510

(51) Int. Cl.
*G06F 1/16* (2006.01)

(52) U.S. Cl.
CPC .............. *G06F 1/1607* (2013.01); *G06F 1/16* (2013.01); *G06F 1/1632* (2013.01)

(58) Field of Classification Search
CPC .... F21V 23/04; F21V 23/003; F21V 33/0004; G06F 1/1607; G06F 1/1609; G06F 1/1611; G06F 1/16; G06F 1/1632
USPC ....................................................... 362/23.05
See application file for complete search history.

(56) References Cited

U.S. PATENT DOCUMENTS

2014/0036507 A1* 2/2014 Chen .................... G02B 6/0001
362/257

* cited by examiner

Primary Examiner — Stephen F Husar
(74) Attorney, Agent, or Firm — Steven M. Reiss

(57) ABSTRACT

An electronic device having an expansion interface includes a shell, a button, a circuit board, switch and a voltage adjusting unit. The shell defines a through hole. The button is movably received in the through hole. The button includes a first electroluminescent portion and a second electroluminescent portion. The switch is electrically connected to the circuit board and is activated by the button to control whether to load a same voltage to the first electroluminescent portion and a second electroluminescent portion to drive them to emit light of equal brightness. The voltage adjusting unit changes the voltage loaded to the second electroluminescent portion to drive the second electroluminescent portion to emit light having a different brightness from the light emitted from the first electroluminescent portion when an expansion device is connected to the expansion interface.

20 Claims, 6 Drawing Sheets

ELECTRONIC DEVICE HAVING EXPANSION INTERFACE

CROSS-REFERENCE TO RELATED APPLICATIONS

This application claims priority to Chinese Patent Application No. 201410630510.7 filed on Nov. 11, 2014, the contents of which are incorporated by reference herein.

FIELD

The present disclosure relates to electronic devices, especially relates to an electronic device having an expansion interface.

BACKGROUND

Computers have expansion interfaces for connecting mobile hard disk drives. When the mobile hard disk drive successfully connects to the computer, a plug-in identifier may be displayed on the electronic device. Some computers will not display the plug-in identifier even if the mobile hard disk drive successfully connects to the computer. Thus, the user thinks the mobile hard disk drive unsuccessfully connects to the computer and tends to unplug and plug in the mobile hard disk drive again and again.

BRIEF DESCRIPTION OF THE DRAWING

Implementations of the present technology will now be described, by way of example only, with reference to the attached figures.

DETAILED DESCRIPTION

Figure 1:
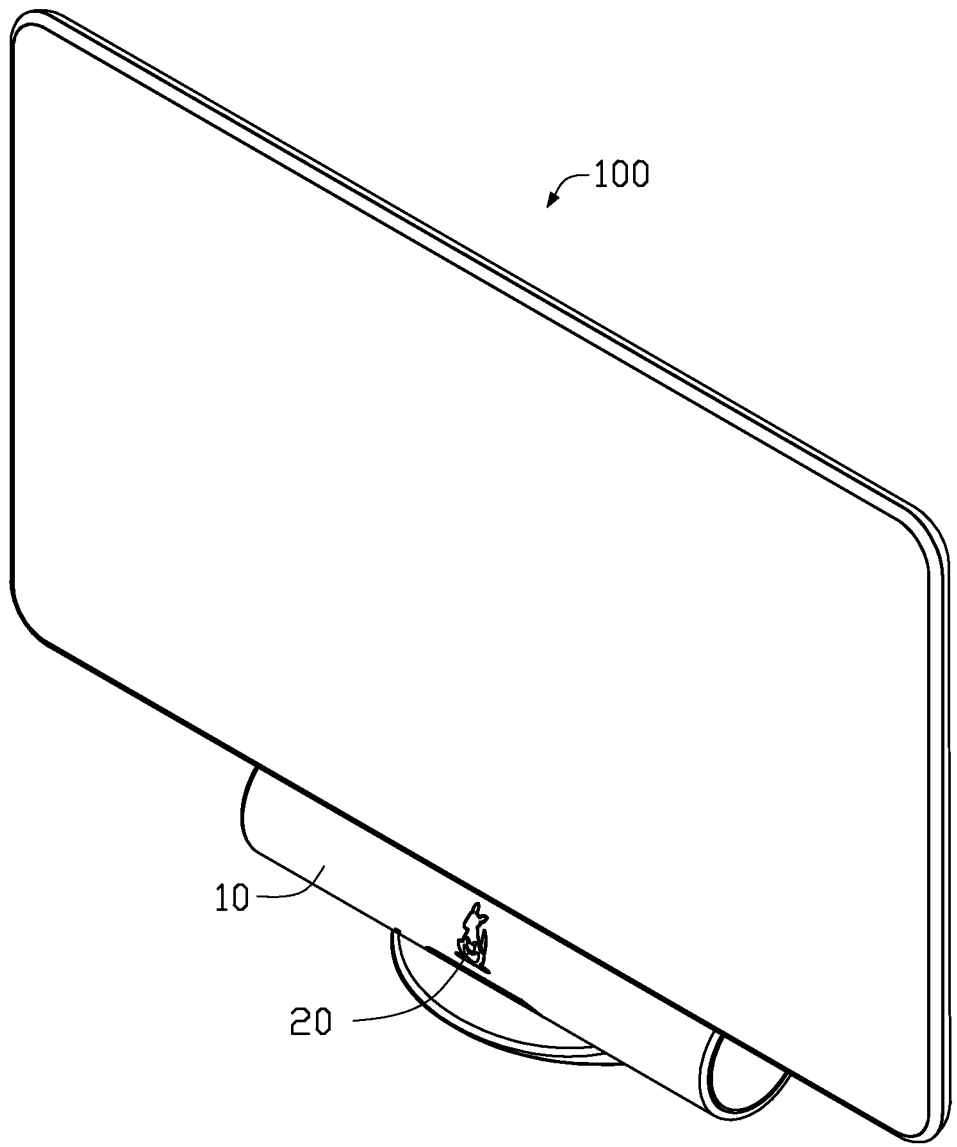
FIG. 1 is an isometric view of an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

A definition that applies throughout this disclosure will now be presented.

The term "comprising" means "including, but not necessarily limited to"; it specifically indicates open-ended inclusion or membership in a so-described combination, group, series and the like.

Figure 2:
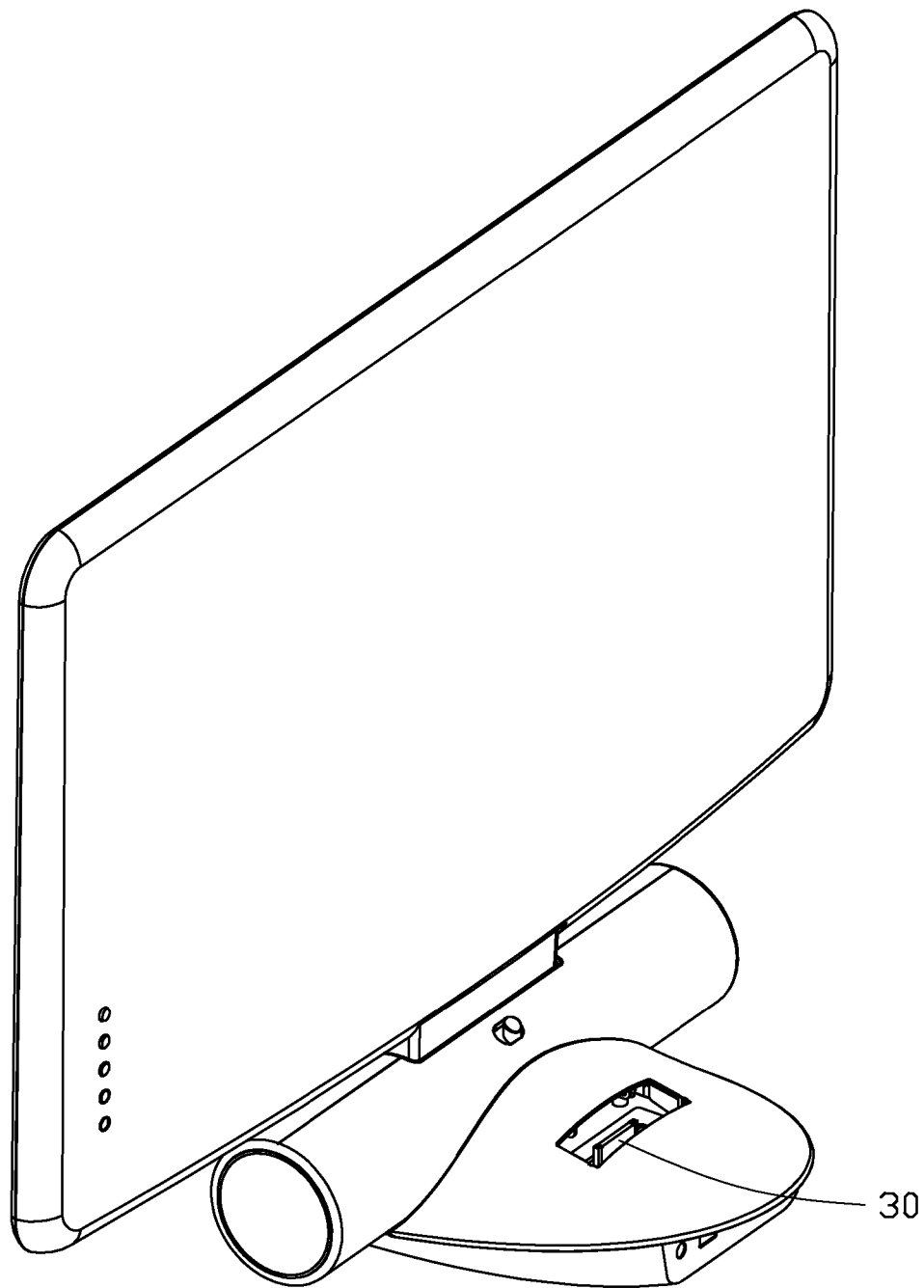
FIG. 2 is similar to FIG. 1, but viewed form another angle.
Figure 3:
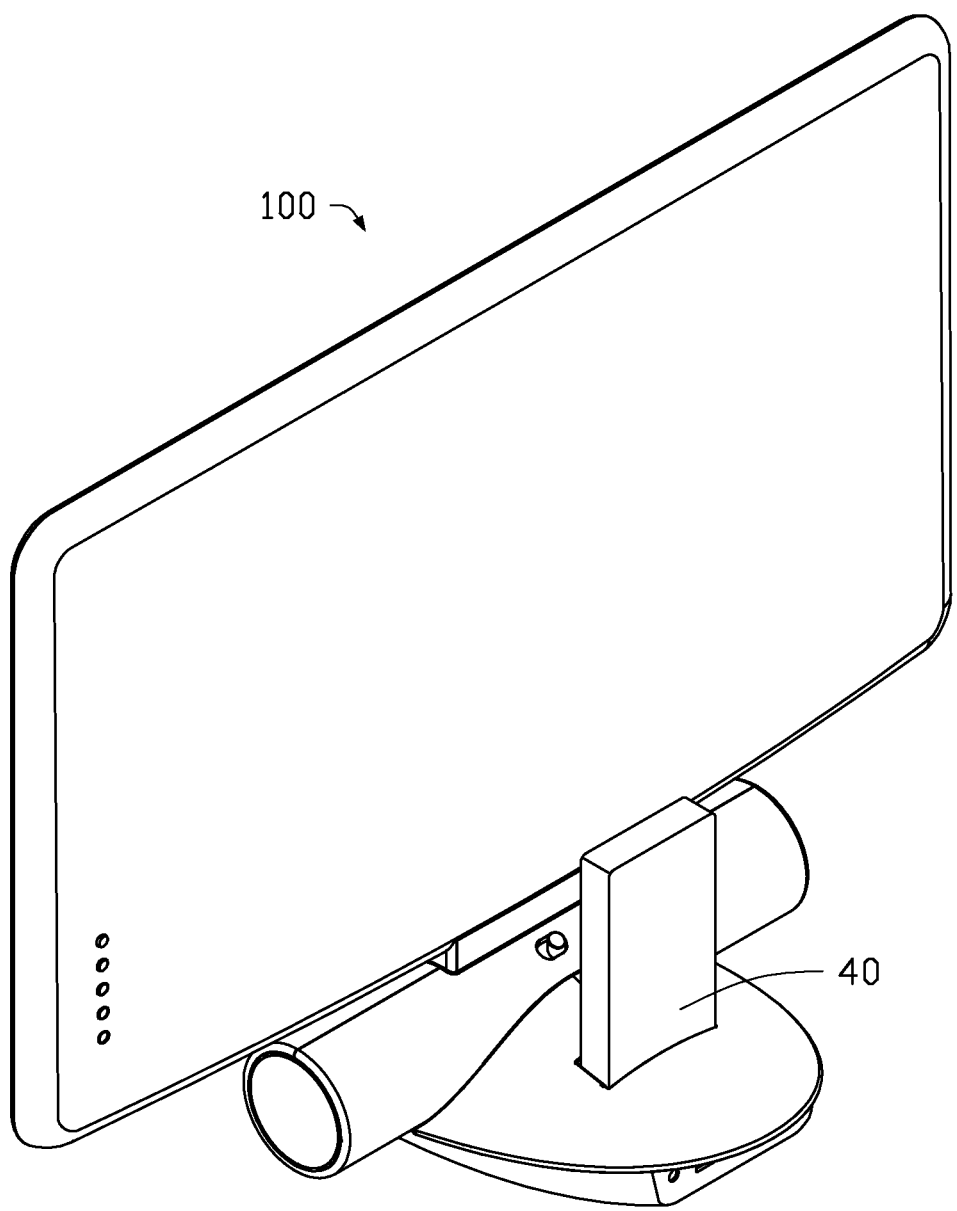
FIG. 3 is similar to FIG. 2, but connected to an expansion device.
Figure 4:
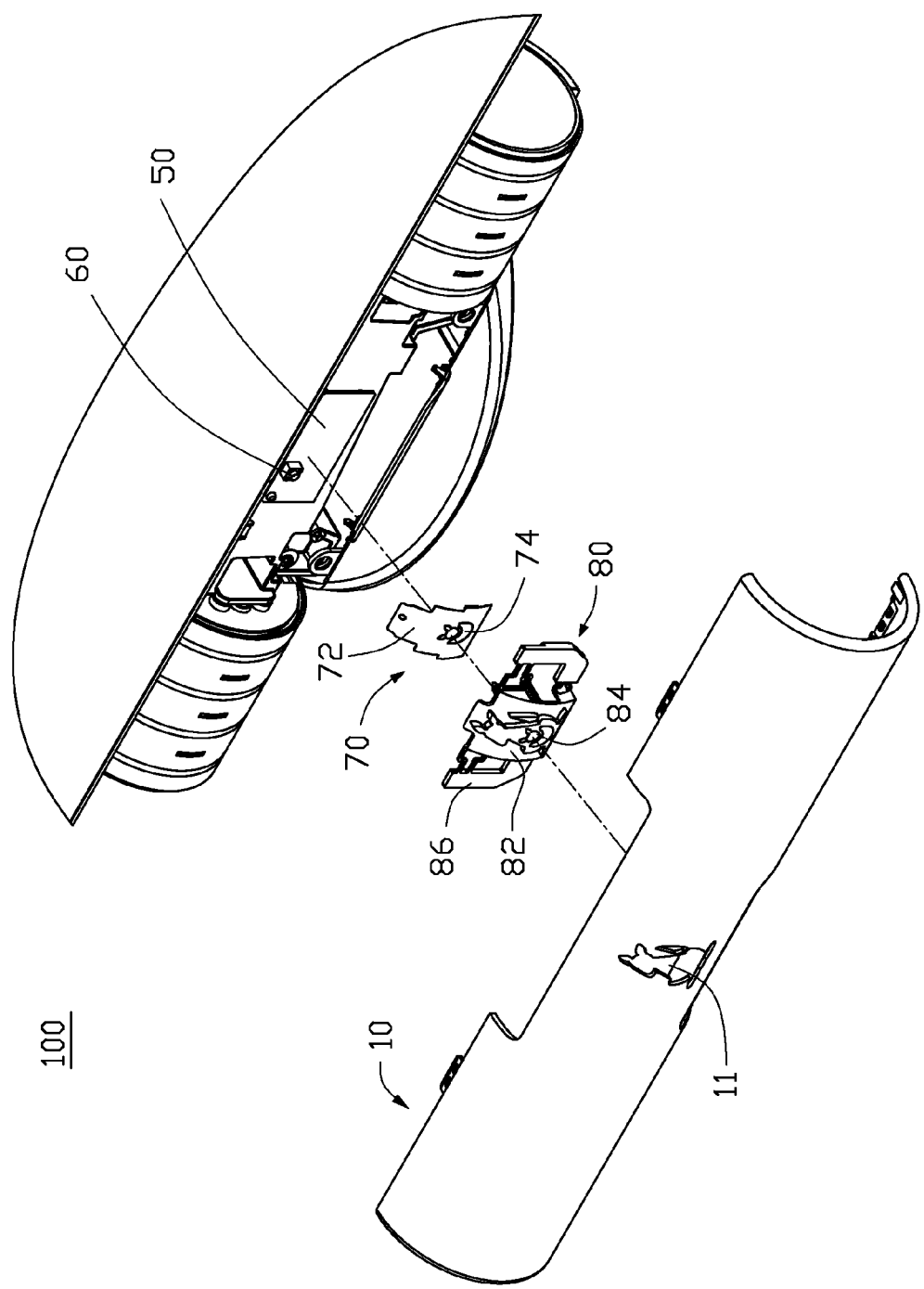
FIG. 4 is an exploded, isometric view of a part of the electronic device in FIG. 1.

FIGS. 1-2 illustrate an electronic device 100. The electronic device 100 includes a shell 10, a button 20 and an expansion interface 30. FIG. 3 illustrates that the expansion interface 30 is configured to connect to an expansion device 40. In the embodiment, the expansion device 40 is a mobile hard disk drive. FIG. 4 illustrates that the electronic device 100 further includes a printed circuit board 50 and a switch 60. The button 20 includes an electroluminescent panel 70 and a light transmission member 80.

Figure 6:
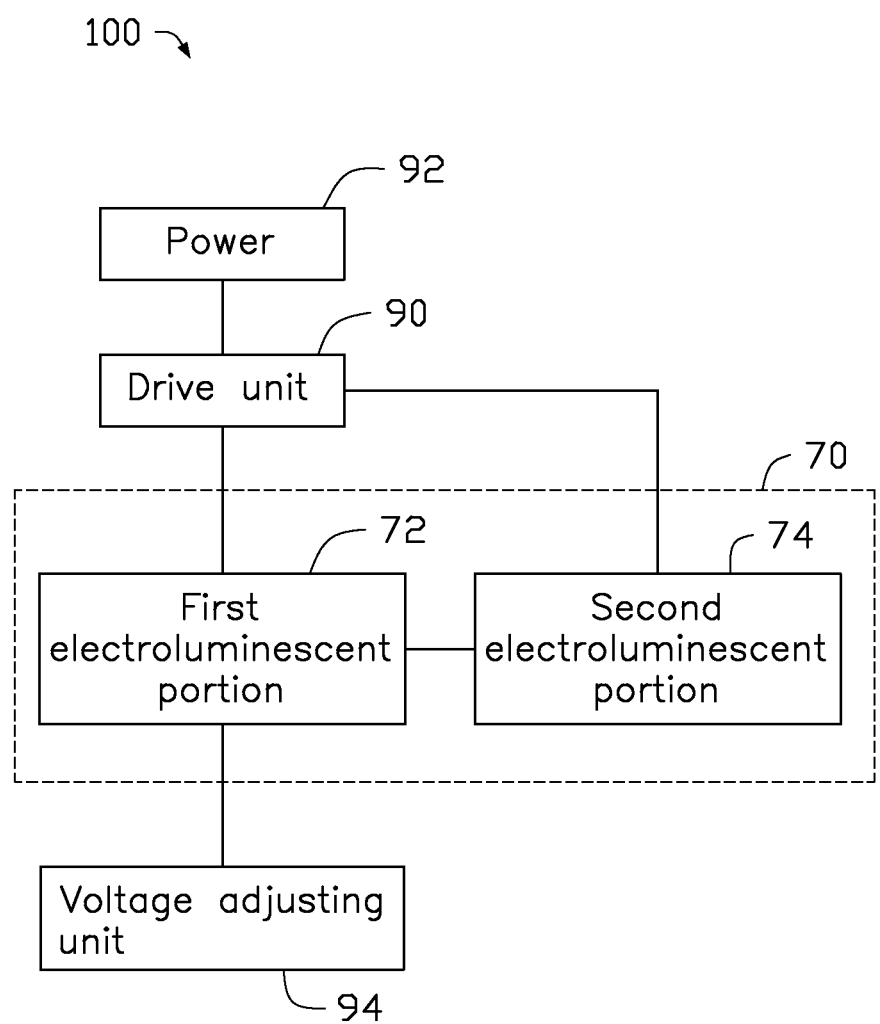
FIG. 6 is block diagram of the electronic device in FIG. 1.

The electroluminescent panel 70 is attached to the light transmission member 80. The electroluminescent panel 70 includes a first electroluminescent portion 72 and at least one second electroluminescent portion 74. FIG. 6 illustrates that the electronic device 100 further includes a drive unit 90. The drive unit 90 is electrically connected to power 92. The first electroluminescent portion 72 and the second electroluminescent portion 74 are connected to the drive unit 90. The drive unit 90 is configured to convert the power 92 to a voltage to drive the first electroluminescent portion 72 and the second electroluminescent portion 74 to emit light. In the embodiment, the electroluminescent panel 70 includes two second electroluminescent portions 74. The first electroluminescent portion 72 defines two first through holes (not labeled). The two second electroluminescent portions 74 are received in the two first through holes and spaced from each other. The first electroluminescent portion 72 and the second electroluminescent portion 74 are adhered to the light transmission member 80 by an adhesive slice.

The shell 10 defines a second through hole 11. The light transmission member 80 is movably received in the second through hole 11. The light transmission member 80 is configured to activate the switch 60. The switch 60 is configured to control whether the first electroluminescent portion 72 and the second electroluminescent portion 74 break over the drive unit 90. When the first electroluminescent portion 72 and the second electroluminescent portion 74 break, the first electroluminescent portion 72 and the second electroluminescent portion 74 are loaded with equal voltage. Thus, the first electroluminescent portion 72 and the second electroluminescent portion 74 emit light having equal brightness. The first electroluminescent portion 72 and the second electroluminescent portion 74 are facing the second through hole 11. Thus, the light emitted by the first electroluminescent portion 72 and the second electroluminescent portion 74 penetrate the light transmission member 80 to be visible to a user.

Figure 5:
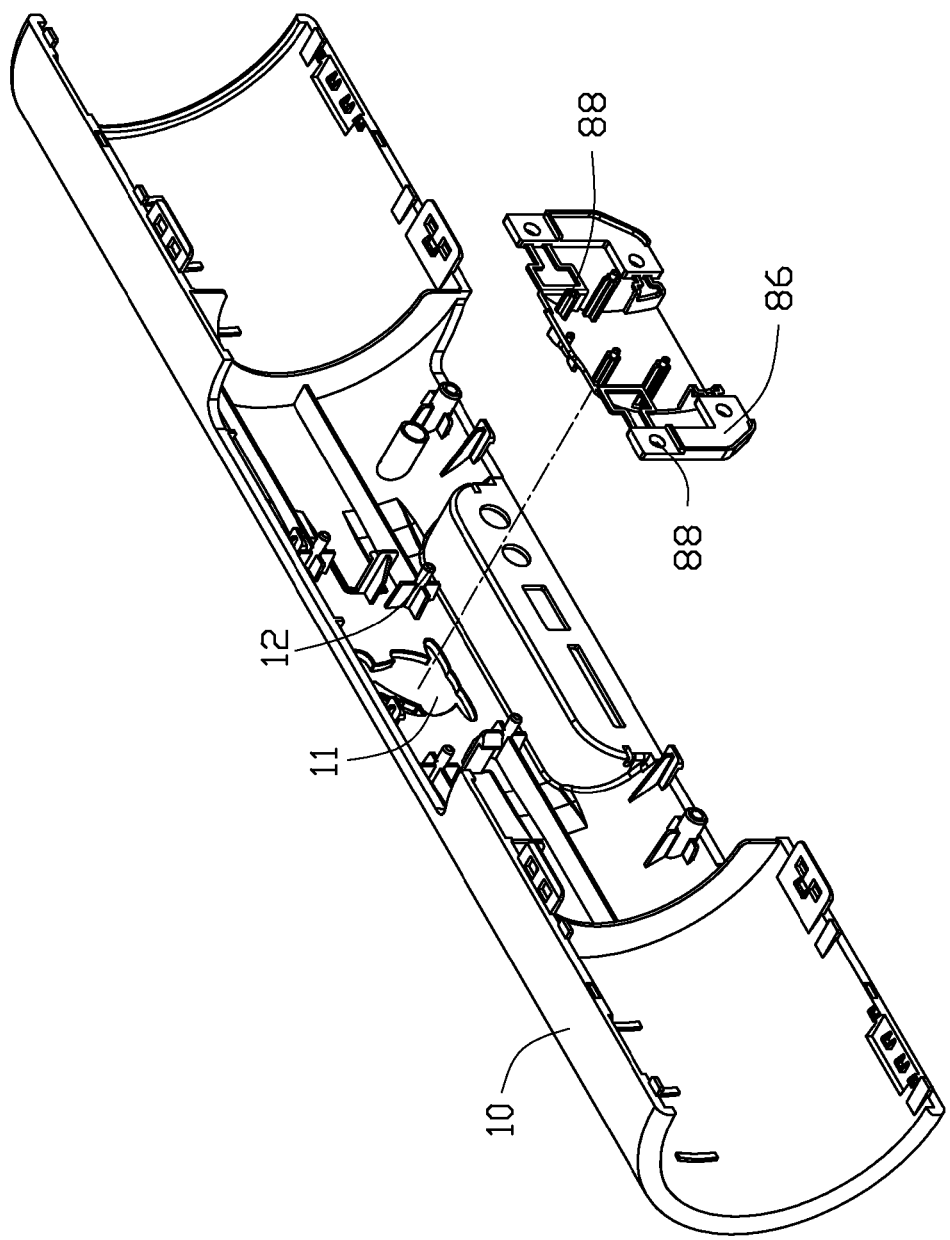
FIG. 5 is similar to FIG. 4, but viewed from another angle with an electroluminescent panel omitted.

In the embodiment, the light transmission member 80 includes a base portion 82, a protrusion portion 84 and two fixing portions 86. The protrusion portion 84 protrudes from the base portion 82 and is received in the second through hole 11. The two fixing portions 86 are extended from two opposite edges of the base portion 82. The two fixing portions 86 are attached to an inner surface of the shell 10. FIG. 5 illustrates that the two fixing portions 86 respectively define a number of fixing holes 85. A number of fixing pins 12 are protruding from the inner surface of the shell 10. The fixing pins 12 are received in the fixing holes 85 and attached to the light transmission member 80 by a hot melt. The light transmission member 80 is elastic. A pressing member 88 protrudes from a side of the light transmission member 80 facing the switch 60. The pressing member 88 is aligned with the switch 60 and configured to turn the switch 60 on or off. The light transmission member 80 may be a transparent plastic member.

The electronic device 100 further includes a voltage adjusting unit 94. The voltage adjusting unit 94 is electrically connected to the second electroluminescent portion 74. When the expansion device 50 is successfully connected to the expansion interface 30, the voltage adjusting unit 94 adjusts the voltage loaded to the second electroluminescent portion 74 driving the second electroluminescent portion 74 to emit light having different brightness than the light emitted from the first electroluminescent portion 72. Thus, two different brightness levels of light are visible when the expansion device 50 is successfully connected to the expansion interface 30. In the embodiment, the voltage adjusting unit 94 is configured to increase the voltage loaded to the second electroluminescent portion 74. Thus, the luminance of the light emitted from the second electroluminescent portion 74 is brighter than that of the first electroluminescent portion 72. An area of the second electroluminescent portion 74 is smaller than that of the first electroluminescent portion 72.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An electronic device having an expansion interface, the electronic device comprising:
    a shell defining a through hole;
    a button movably received in the through hole, the button comprising a first electroluminescent portion and a second electroluminescent portion;
    a circuit board;
    a switch electrically connected to the circuit board and configured to be activated by the button, wherein the switch controls whether to transmit a same voltage to the first electroluminescent portion and a second electroluminescent portion to drive them to emit light of equal brightness; and
    a voltage adjusting unit configured to change the voltage transmitted to the second electroluminescent portion to drive the second electroluminescent portion to emit light having a different brightness from the light emitted from the first electroluminescent portion when an expansion device is successfully connected to the expansion interface.

2. The electronic device of claim 1, wherein the voltage adjusting unit is configured to increase the voltage transmitted to the second electroluminescent portion.

3. The electronic device of claim 2, wherein an area of the second electroluminescent portion is smaller than that of the first electroluminescent portion.

4. The electronic device as claimed in claim 1, further comprising:
    a power;
    a drive unit electrically connected to the power;
    wherein the first electroluminescent portion and the second electroluminescent portion are connected to the drive unit; the drive unit is configured to convert the power to the same voltage to drive the first electroluminescent portion and the second electroluminescent portion to emit same brightness light.

5. The electronic device of claim 1, further comprising:
    a light transmission member movably received in the through hole, the first electroluminescent portion and the second electroluminescent portion are attached to the light transmission member.

6. The electronic device of claim 5, wherein the first electroluminescent portion and the second electroluminescent portion are spaced apart from each other.

7. The electronic device of claim 6, wherein the first electroluminescent portion defines a through hole, and the second electroluminescent portion is received in the through hole of the first electroluminescent portion.

8. The electronic device of claim 5, wherein the light transmission member comprises a base portion, a protrusion portion and two fixing portions, the protrusion portion protrudes from the base portion and is received in the through hole, the two fixing portions are extended from two opposite edges of the base portion, the two fixing portions are attached to an inner surface of the shell.

9. The electronic device of claim 1, wherein the two fixing portions respectively define a plurality of fixing holes, a plurality of fixing pins protrude form an inner surface of the shell, the plurality of fixing pins is received in the plurality of fixing holes and attached to a light transmission member by a holt melt way.

10. The electronic device of claim 5, wherein the light transmission member is elastic, a pressing member protrudes from a side of the light transmission member facing the switch, the pressing member is aligned with the switch and configured to turn on or turn off the switch.

11. An electronic device having an expansion interface, the electronic device comprising:
    a shell defining a through hole;
    a first light emitting member, the brightness of a light emitted from the first light emitting member being determined by a voltage transmitted to the first light emitting member and the light emitted from the first light member being visible outside of the shell;
    a second light emitting member, a brightness of light emitted from the second light emitting member being determined by a voltage transmitted to the second light emitting member and the light emitted from the second light member being visible outside of the shell;
    a circuit board;
    a switch electrically connected to the circuit board and configured to control a equal voltage to be transmitted to the first light emitting member and the second light emitting member;
    a button movably received in the through hole to activate the switch; and
    a voltage adjusting unit configured to change the voltage transmitted to the second light emitting member when an expansion device is successfully connected to the expansion interface.

12. The electronic device of claim 11, wherein the voltage adjusting unit is configured to increase the voltage transmitted to the second light emitting member.

13. The electronic device of claim 12, wherein an area of the second light emitting member is smaller than that of the first light emitting member.

14. The electronic device of claim 11, further comprising:
    a power;
    a drive unit electrically connected to the power;
    wherein the first light emitting member and the second light emitting member are connected to the drive unit, the drive unit is configured to convert the power to the same voltage to drive the first light emitting member and the second light emitting member to emit same brightness light.

15. The electronic device of claim 11, further comprising:
a light transmission member movably received in the through hole, the first light emitting member and the second light emitting member are attached to the light transmission member.

16. The electronic device of claim 15, wherein the first light emitting member and the second light emitting member are spaced apart from each other.

17. The electronic device of claim 16, wherein the first light emitting member defines a through holes, and the second light emitting member is received in the through hole of the first light emitting member.

18. The electronic device of claim 15, wherein the light transmission member comprises a base portion, a protrusion portion and two fixing portions, the protrusion portion protrudes from the base portion and is received in the through hole, the two fixing portions are extended from two opposite edges of the base portion, the two fixing portions are attached to an inner surface of the shell.

19. The electronic device of claim 11, wherein the two fixing portions respectively defines a plurality of fixing holes, a plurality of fixing pins is protruded form an inner surface of the shell, the plurality of fixing pins is received in the plurality of fixing holes and attached to a light transmission member by a holt melt way.

20. The electronic device of claim 15, wherein the light transmission member is elastic, a pressing member protrudes from a side of the light transmission member facing the switch, the pressing member is aligned with the switch and configured to turn on or turn off the switch.

* * * * *